United States Patent
Puri et al.

(10) Patent No.: US 6,339,618 B1
(45) Date of Patent: Jan. 15, 2002

(54) MESH NODE MOTION CODING TO ENABLE OBJECT BASED FUNCTIONALITIES WITHIN A MOTION COMPENSATED TRANSFORM VIDEO CODER

(75) Inventors: Atul Puri, Riverdale; A. Murat Tekalp, Rochester, both of NY (US); Petrus J. L. van Beek, Vancouver, WA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/584,176

(22) Filed: May 31, 2000

Related U.S. Application Data

(63) Continuation of application No. 09/998,855, filed on Dec. 29, 1997, now Pat. No. 6,148,026.
(60) Provisional application No. 60/035,218, filed on Jan. 8, 1997.

(51) Int. Cl.[7] .................................................. H04N 7/36
(52) U.S. Cl. .................................. 375/240.16; 382/243
(58) Field of Search .......................... 375/240.16, 240; 382/243, 232, 233, 236, 238, 241; 348/384.1, 390.1, 397.1, 402.1, 409.1, 415.1, 416.1, 420.1, 699

(56) References Cited

U.S. PATENT DOCUMENTS

| 5,923,777 A | * | 7/1999 | Chun et al. ................. 382/241 |
| 5,936,671 A | * | 8/1999 | Beek et al. ............ 375/240.14 |
| 6,148,026 A | * | 11/2000 | Puri et al. .............. 375/240.16 |

* cited by examiner

*Primary Examiner*—Howard Britton

(57) ABSTRACT

A method and apparatus for coding video data permits coding of video information with optional, enhanced functionalities. Video data is coded as base layer data and enhancement layer data. The base layer data includes convention motion compensated transform encoded texture and motion vector data. Optional enhancement layer data contains mesh node vector data. Mesh node vector data of the enhancement layer may be predicted based on motion vectors of the base layer. Thus, simple decoders may decode the base layer data and obtain a basic representation of the coded video data. However, more powerful decoders may decode both the base layer and enhanced layer to obtain decoded video permitting functionalities. An embodiment of the present invention provides a back channel that permits a decoder to affect how mesh node coding is performed in the encoder. The decoder may command the encoder to reduce or eliminate encoding of mesh node motion vectors. The back channel finds application in single layer systems and two layer systems.

8 Claims, 6 Drawing Sheets

MESH NODE MOTION CODING TO ENABLE OBJECT BASED FUNCTIONALITIES WITHIN A MOTION COMPENSATED TRANSFORM VIDEO CODER

RELATED APPLICATION

This application is a continuation of Ser. No. 09/998,855 filing date Dec. 29, 1997. Now U.S. Pat. No. 6,148,026 which claims benefits from priority of U.S. Provisional Application No. 60/035,218, filed on Jan. 8, 1997.

BACKGROUND OF THE INVENTION

1. Field of the Invention

This invention relates to coding of digital video signals using mesh or wireframe modeling. More particularly, the invention relates to a coding scheme that codes video data as a base layer of coded data and a second, supplementary layer of mesh node coded data. The mesh node coding permits decoders to apply enhanced functionalities to elements of the video image.

2. Related Art

Video coding techniques are known. Typically, they code video data at a first data rate down to a second, lower, data rate. Typically, such coding is necessary to transmit the video information through a channel, which may be a radio channel, a data link of a computer network, or a storage element such as an optical or magnetic memory. Video coding reduces the capacity requirements of channels and permits the video information to be reconstructed at a decoder for display or manipulation.

Different coding applications have different objectives. Some desire only to code and decode video data. Others, however, particularly those that code synthetic video data, desire to attach functionalities to the video. Functionalities may include: motion tracking of moving objects, temporal interpolation of objects, modification of video objects (such as warping an image upon a video object), manipulation of size, orientation or texture of objects in a scene. Often, such operations are needed to be performed on individual objects in a scene, some of which may be synthetic others of which are natural.

One proposed standard for video coding has been made in the MPEG-4 Video Verification Model Version 5.1, ISO/IEC JTC1/ISC29/WG11 N1469 Rev., December 1996("MPEG-4, V.M. 5.1"). According to MPEG-4, V.M. 5.1, encoders identify "video objects" from a scene to be coded. Individual frames of the video object are coded as "video object planes" or VOPs. The spatial area of each VOP is organized into blocks or macroblocks of data, which typically are 8 pixel by 8 pixel (blocks) or 16 pixel by 16 pixel (macroblocks) rectangular areas. A macroblock typically is a grouping of four blocks. For simplicity, reference herein is made to blocks and "block based coding" but it should be understood that such discussion applies equally to macroblocks and macroblock based coding. Image data of the blocks are coded by an encoder, transmitted through a channel and decoded by a decoder.

Under MPEG4, V.M. 5.1 coding, block data of most VOPs are not coded individually. Shown in FIG. 1A, image data of a block from one VOP may be used as a basis for predicting the image data of a block in another VOP. Coding first begins by coding an initial VOP, an "I-VOP", without prediction. However, the I-VOP data may be used to predict data of a second VOP, a "P-VOP". Blocks of the second VOP are coded based on differences between the actual data and the predicted data from blocks of the I-VOP. Finally, image data of a third type of VOP may be predicted from two previously coded VOPs. The third VOP is a "bidirectional VOP" or B-VOP. As is known, the B-VOP typically is coded after the I-VOP and P-VOP are coded. However, the different types of VOPs may be (and typically are) coded in an order that is different than the order in which they are displayed. Thus, as shown in FIG. 1A, the P-VOP is coded before the B-VOP even though it appeared after the B-VOP. Other B-VOPs may appear between the I-VOP and the P-VOP.

Where prediction is performed (P-VOP and B-VOP), image data of blocks are coded as, motion vectors and residual texture information. Blocks may be thought to "move" from frame to frame (VOP to VOP). Thus, MPEG-4 codes motion vectors for each block. The motion vector, in effect, tells a decoder to predict the image data of a current block by moving image data of blocks from one or move previously coded VOPs to the current block. However, because such prediction is imprecise, the encoder also transmits residual texture data representing changes that must be made to the predicted image data to generate accurate image data. Encoding of image data using block based motion vectors and texture data is known as "motion compensated transform encoding."

Coding according to the MPEG-4 V.M. 5.1 is useful to code video data efficiently. Further, it provides for relatively simple decoding, permitting viewers to access coded video data with low-cost, low-complexity decoders. The coding proposal is limited, however, because it does not provide for functionalities to be attached to video objects.

As the MPEG-4, V.M. 5.1 coding standard evolved, a proposal was made to integrate functionalities. The proposed system, a single layer coding system, is shown in FIG. 1B. There, video data is subject to two types of coding According to the proposal, texture information in VOPs is coded on a block basis according to motion compensated transform encoding. Motion vector information would be coded according to a different technique, mesh node motion encoding. Thus, encoded data output from an encoder 110 includes block based texture data and mesh node based motion vectors.

Mesh node modeling is a well known tool in the area of computer graphics for generating synthetic scenes. Mesh modeling maps artificial or real texture to wireframe models and may provide animation of such scenes by moving the nodes or node sets. Thus, in computer graphics, mesh node modeling represents and animates synthetic content. Mesh modeling also finds application when coding natural scenes, such as in computer vision applications. Natural image content is captured by a computer, broken down into individual components and coded via mesh modeling. As is known in the field of synthetic video, mesh modeling provides significant advantages in attaching functionalities to video objects. Details of known mesh node motion estimation and decoding can, be found in: Nakaya, et al., "Motion Compensation Based on Spatial Transformations," IEEE Trans. Circuits and Systems for Video Technology, pp. 339–356, June 1994; Tekalp, et al., "Core experiment M2: Updated description," ISO/IEC JTC1/SC29/WG11 MPEG96/1329, September 1996; and Tekalp, et al., "Revised syntax and results for CE M2(Triangular mesh-based coding)," ISO/IEC JTC1/SC29/WG11 MPEG96/1567, November 1996.

A multiplexer 120 at the encoder merges the data with other data necessary to provide for complete encoding such as administrative overhead data, possibly audio data or data from other video objects. The merged coded data is output to the channel 130. A decoder includes a demultiplexer 140 and a VOP decoder 150 that inverts the coding process applied at the encoder. The texture data and motion vector data of a particular VOP are decoded by the decoder 150 and output to a compositor 160. The compositor 160 assembles the decoded information with other data to form a video data stream for display.

By coding image motion according to mesh node notation, the single layer system of FIG. 1B permits decoders to apply functionalities to a decoded image. However, it also suffers from an important disadvantage: All decoders must decode mesh node motion vectors. Decoding of mesh node motion vectors is computationally more complex than decoding of block based motion vectors. The decoders of the system of FIG. 1B are more costly because they must meet higher computational requirements. Imposing such cost requirements is disfavored, particularly for general purpose coding protocols where functionalities are used in a limited number of coding applications.

Thus, there is a need in the art for a video coding protocol that permits functionalities to be attached to video objects. Further, there is a need for such a coding protocol that is inter-operable with simple decoders. Additionally, there is a need for such a coding protocol that provides coding for the functionalities in an efficient manner.

SUMMARY OF THE INVENTION

The disadvantages of the prior art are alleviated to a great extent by a method and apparatus for coding video data as base layer data and enhancement layer data. The base layer data includes convention motion compensated transform encoded texture and motion vector data. Optional enhancement layer data contains mesh node vector data. Mesh node vector data of the enhancement layer may be predicted based on motion vectors of the base layer. Thus simple decoders may decode the base layer data and obtain a basic representation of the coded video data. However, more powerful decoders may decode both the base layer and enhanced layer to obtain decoded video permitting functionalities.

An embodiment of the present invention provides a back channel that permits a decoder to affect how mesh node coding is performed in the encoder. The decoder may command the encoder to reduce or eliminate encoding of mesh node motion vectors. The back channel finds application in single layer systems and two layer systems.

DETAILED DESCRIPTION

Embodiments of the present invention achieve one or more of the following goals:

Scalability: Mesh node motion vector information is provided in an optional second layer of coding. A first, base layer of video data provides full coding of the video data. A simple decoder may derive full video data by decoding only the code base layer data. However, a user with a more complex decoder may decode both the base layer video data and the enhanced layer to obtain a video output with enhanced functionalities.

Efficiency: Mesh node motion vectors may be coded efficiently to reduce the bitrate consumed by the mesh node motion vectors.

Control: Mesh node motion vector may prove to possess less utility in certain coding applications than others. Indeed, in some applications, they may provide to be unnecessary altogether. In such instances, mesh node motion vectors may be eliminated from coding altogether.

Figure 1A:
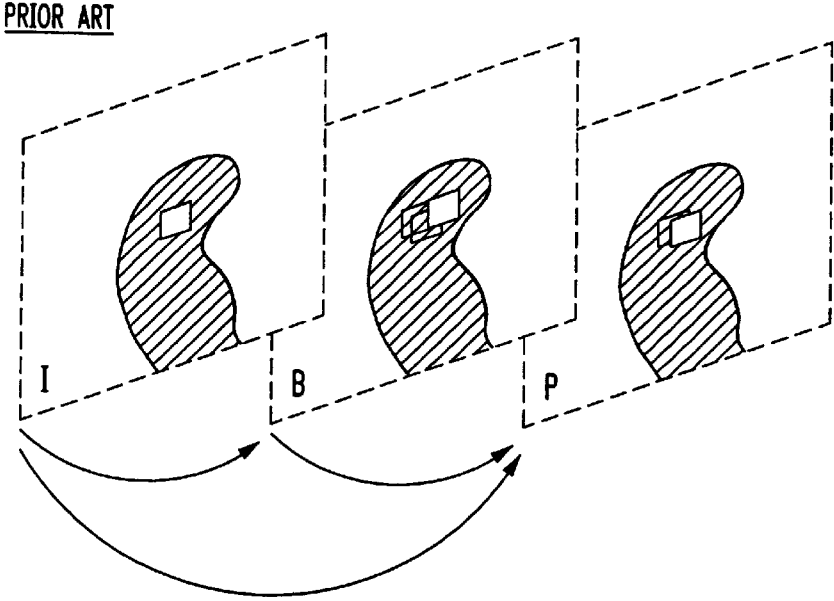
FIG. 1A illustrates relationships among I-VOPs, P-VOPs and B-VOPs.
Figure 1B:
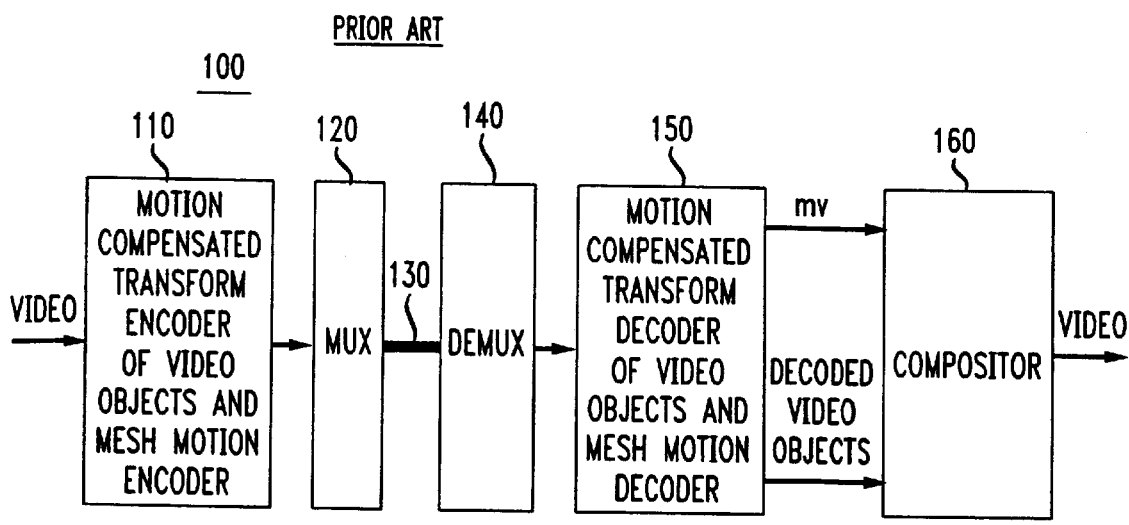
FIG. 1B is a block diagram of a known single layer video coding system that facilitates functionalities.
Figure 1C:
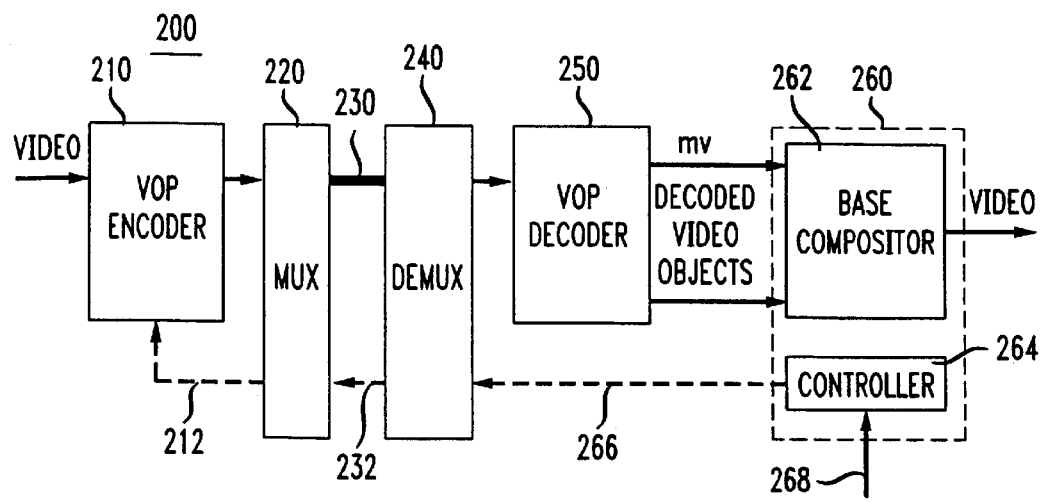
FIG. 1C is a block diagram of a single layer video coding system facilitating functionalities, constructed in accordance with the present invention.

In a first embodiment, shown in FIG. 1C, a single layer video coding system 200 employs a back channel to selectively reduce or eliminate mesh node motion vectors from encoded video data. A VOP encoder 210 performs motion compensated transform encoding of a VOP. The VOP encoder 210 outputs texture data and motion data both coded on a block basis. Additionally, the encoder 210 outputs motion data generated on a mesh node basis. The mesh node motion data and the block motion data, although somewhat redundant, constitute integral base layer data. Both are necessary to decode the video data. A multiplexer 220 merges the coded data for one VOP with other coded data and outputs the merged data to the channel 230.

A demultiplexer 240 retrieves the merged data stream from the channel 230 and routes encoded data of different types to respective decoders. The data encoded by encoder 210 is decoded by a VOP decoder 250. The VOP decoder 250 performs motion compensated transform decoding using the block based and texture data, the block based motion vectors and the mesh node motion vectors. The VOP decoder 250 outputs decoded video objects and decoded motion vector data to a compositor 260. The compositor 260 synthesizes the decoded VOPS, the motion vector data and data from other visual elements into a synthesized image. The compositor 260 outputs data of the synthesized image for display, storage or other uses.

The present invention provides a back channel in the coding system 200 that controls how many, if any, mesh node motion vectors are encoded in the base layer. The back channel 232 is a very low bitrate channel enabled by the demultiplexer 240 and the multiplexer 220. In this system, the compositor 260 includes two elements: First, a base compositor 262 performs the features of known compositors by synthesizing the decoded VOP data and decoded motion vector data with other decoded image data into an image for display. Second, a controller 264 communicates with the VOP encoder 210 via a back channel 232 to selectively reduce or disable mesh node motion vectors in the base layer.

The controller 264 may be preprogrammed to recognize events where it is appropriate to reduce or eliminate the mesh node motion vector. When such an event occurs, the controller 264 outputs a command signal to the demultiplexer 240, represented by line 266. The demultiplexer inserts the command into the channel 230, represented as back channel 232. The multiplexer 220 retrieves the back channel 232 from the channel 230 and routes it to the encoder 210, represented by line 212. In response to a command contained in the back channel 232, the encoder 210 responds accordingly. It reduces or eliminates the mesh node motion vectors.

The controller 264 may reduce or eliminate the mesh node vectors in response to one of three triggering events defined below. In the first condition, the actual bitrate of the channel may exceed the channel's capacity temporarily. Such events occur when external forces reduce the capacity of the channel or when the multiplexer 220 merges the coded VOP data with data from other data sources that exhibits burstiness. A reduction or elimination of the mesh motion vectors may cause the actual bitrate to meet the new coding limit. In the second condition, a particular image may have been coded using too fine a mesh given the uses for which the VOP decoder 250 is decoding the data. That is, too many nodes may have been defined to encode the image. The controller 264 may cause the VOP encoder 210 to recode the image using fewer mesh nodes and, therefore, reduce the channel bitrate. The third triggering event may be determined by user control input to the controller over line 268.

In a second embodiment of the present invention, encoded video data is output to a channel 340 in a layered coded bitstream. Shown in FIG. 2A, an encoder 300 includes a base layer encoder 310 and an enhancement layer encoder 320. Video data, such as VOP data, is input to each. The base layer encoder 310 performs the known motion compensated transform encoding. It outputs base layer coded data which includes texture data and motion vector data coded on a block basis. The base layer coded data completely represents the input video data.

The enhancement layer encoder 320 encodes the video data as motion vectors calculated on a mesh node basis. It performs the mesh node motion vector computation based on known techniques.

The coded outputs of the base layer encoder 310 and the enhancement layer encoder 320 are output to a multiplexer 330. The multiplexer 330 merges the base layer and enhanced layer coded data, possibly with data from other sources (not shown), into a unitary bitstream and outputs the bitstream to a channel 340. Because block based motion vectors are output along with mesh node motion vectors, this technique may be referred to as a "functionality simulcast" approach.

A decoder 400 performs decoding operations that undo the coding applied at the encoder 300. It includes a base layer decoder 410 and an enhancement layer decoder 420. A demultiplexer 430 identifies each type of coded data (base layer coded data, enhancement layer coded data, etc.) and routes the data types to respective decoders. Thus, the base layer coded data is routed to the base layer decoder 410 and the enhancement layer coded data is routed to the enhancement layer decoder 420. The base layer decoder 410 performs conventional motion compensated transform decoding based on the block based texture and motion coding. It outputs decode video. Similarly, the enhancement layer decoder 420 performs conventional mesh node motion vector decoding and outputs decode motion information.

The decoder 400 includes a compositor 440 that synthesizes the decoded VOP data and motion vector information into synthesized image data for display, storage or other manipulation. As with the other compositors 440 it may integrate the image data of the VOP with other video data to generate a synthesized image.

Figure 2A:
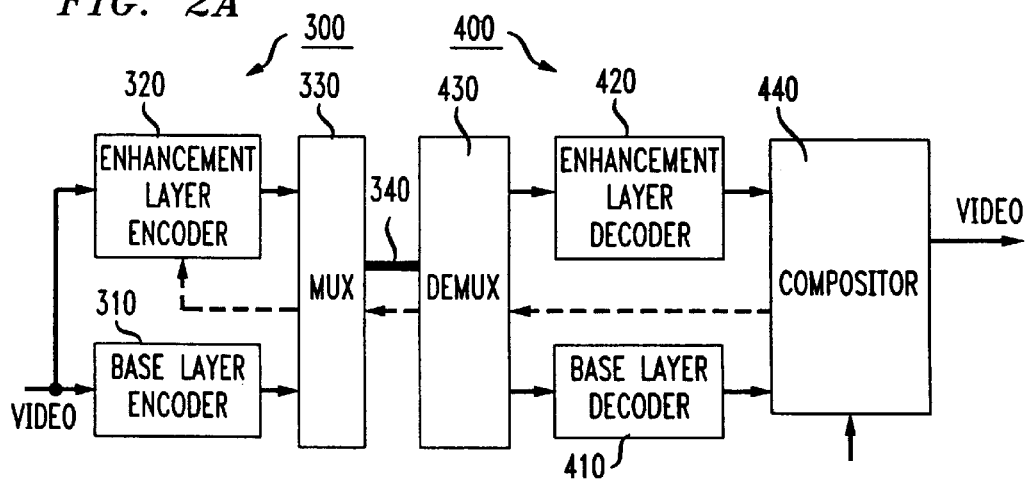
FIG. 2A is a block diagram of a two-layer video coding system facilitating functionalities, constructed in accordance with a first embodiment of the present invention.

The two layer coding system of FIG. 2A may include an optional back channel as is provided in the system of FIG. 1C. Back channel commands issued by the compositor 440 are provided to the demultiplexer 430. The demultiplexer 430 outputs the back channel command to the channel 340. The encoder multiplexer 330 retrieves commands from the back channel 342. In the two layered embodiment of FIG. 2A, the multiplexer 330 back channel 342 may provide then directly to the enhanced layer encoder 320. Responsive to the type of command contained in the back channel, the enhancement layer encoder 320 may reduce or eliminate mesh node motion encoding and reduce or eliminate the channel capacity that is consumed by the mesh node motion vectors.

In the two layered embodiment, the back channel may provide additional utility beyond that described with respect to FIG. 1C. In the two layer system the decoder 400 may be programmed to operate in many modes of operation. Certain modes may include the functionalities for which mesh node encoding is useful, others may not. Where the decoder 400 operates in a mode that does not require mesh node encoding the compositor 440 may command the encoder 300 to disable the mesh node encoding altogether.

The layered coding protocol of FIG. 2A achieves several objectives of the present invention. First, it enables the mesh node motion vector coding that is particularly suitable to permit the functionalities desired in advanced coding applications. Second, it is scalable. The coded base layer data provides a full representation of the video being coded. The mesh node motion vectors are optional. Simple decoders, those that are incapable of performing the relatively complicated mesh node decoding computations, may decode the coded base layer data and regenerate a complete representation of the original input video data therefrom. Demultiplexers of the simple decoder would ignore the coded enhanced layer data. Third, the two layer system provides control at the decoder 400. Where mesh node motion vectors are unnecessary, the decoder 400 may command the encoder 300 via a back channel to omit them from the encoded output.

A second embodiment of a two layered coding system provides improved coding of mesh node motion vectors. Shown in FIG. 2B, the system includes an encoder 500 that is populated by a base layer encoder 510 and an enhancement layer encoder 520. The base layer encoder 510 encodes input video data by motion compensation transform encoding. It outputs coded base layer data that includes texture information and motion information encoded on a block basis.

The encoder 500 also includes an enhancement layer encoder 520 that encodes input video data according to mesh node motion encoding. In this second embodiment, however, the enhancement layer encoder predicts mesh node motion vectors, in part, from the block based motion vectors generated by base layer encoder 510.

Figure 3:
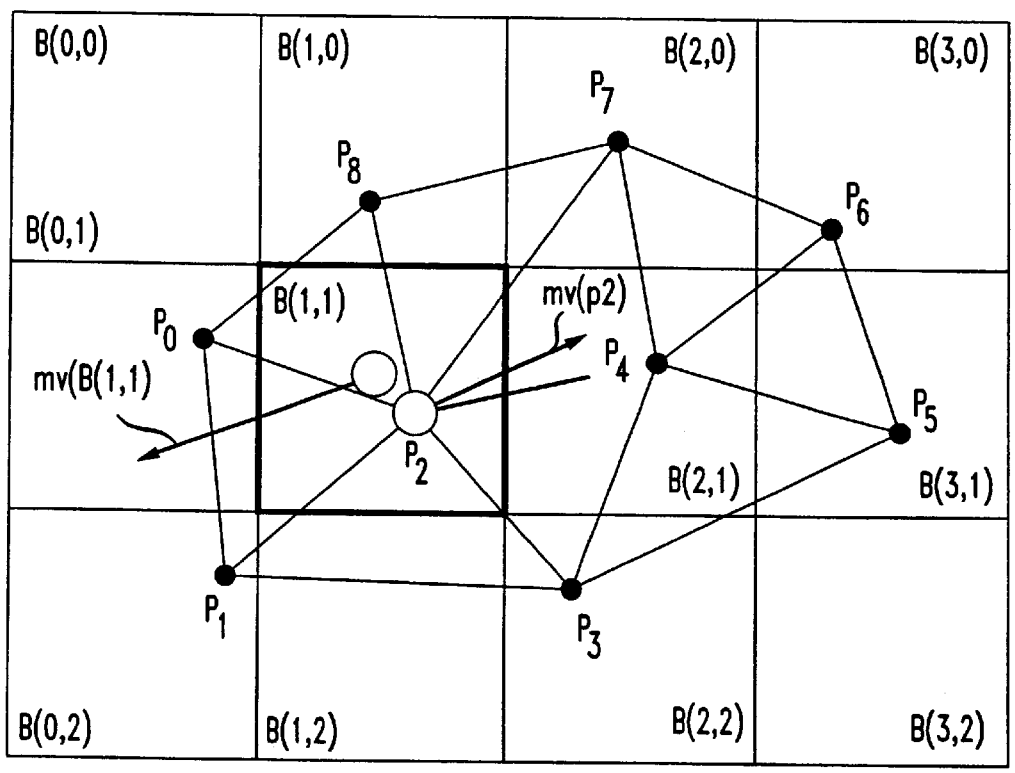
FIG. 3 illustrates superposition of mesh nodes and blocks within a VOP.

FIG. 3 shows a relationship between blocks and mesh nodes that are calculated from the same image data. Blocks B(0,0)–B(3,2) are calculated by the base layer encoder 510 during the motion compensated transform encoding process. Also, the base layer encoder 510 computes a motion vector for each block. FIG. 3 illustrates one such motion vector, mv(B(1,1)). The enhancement layer encoder 520 computes mesh nodes $P_0$–$P_8$ based on the information content of the input video data. Each mesh node falls within one of the blocks. For example, mesh node $p_0$ falls within B(0,1), mesh node $P_1$ falls within B(0,2).

Figure 2B:
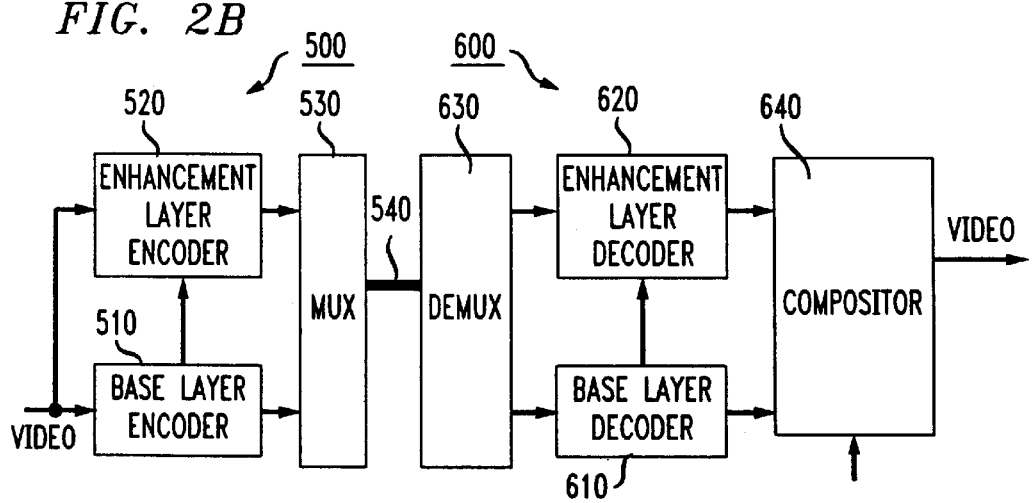
FIG. 2B is a block diagram of a two-layer video coding system facilitating functionalities, constructed in accordance with a second embodiment of the present invention.
Figure 4A:
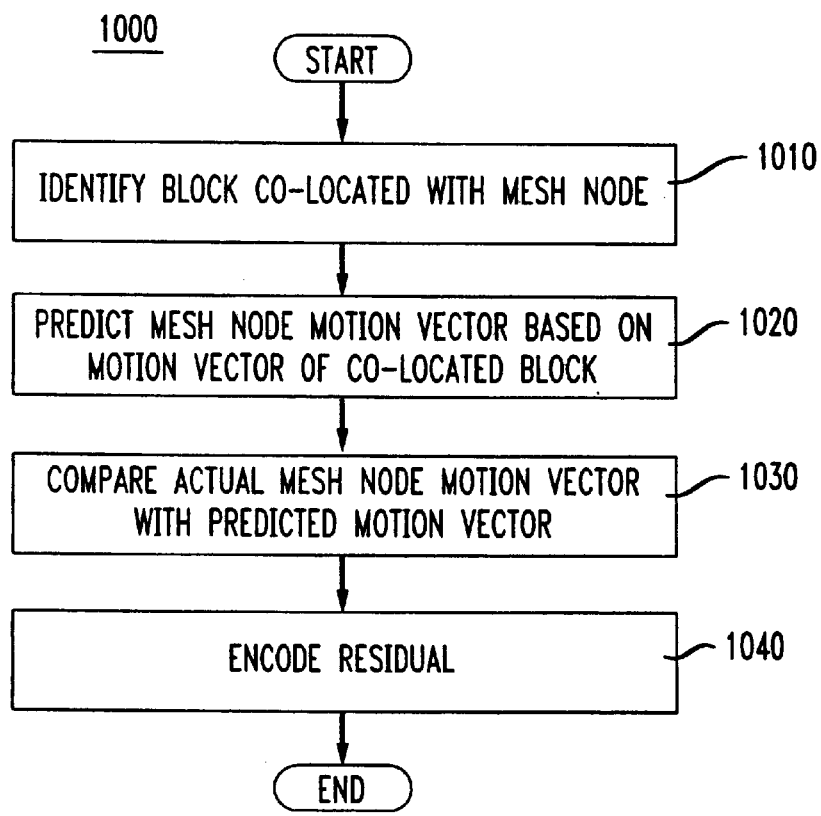
FIG. 4A is a flow diagram of an enhancement layer encoder operating in accordance with the present invention.

The system of FIG. 2B predicts motion vectors for each mesh node based upon the motion vectors of spatially related blocks. Encoding of mesh node motion vectors proceeds according to the method 1000 of FIG. 4A. For a mesh node of interest $P_n$, the enhancement layer encoder identifies the block B(ij) in which the mesh node sits (Step 1010). The enhancement layer encoder predicts a motion vector for the mesh node based upon the co-located block and, perhaps, its neighbors (Step 1020). The enhancement layer then compares the predicted motion vector against the actual motion vector of the mesh node (Step 1030). It encodes and outputs a residual representing the difference between the actual motion vector and the predicted motion vector for the mesh node $P_n$ (Step 1040).

Identification of the block B(ij) that contains the node point p. is quite simple. The mesh node $p_n$ is indexed by a coordinate $(x_n, y_n)$. Blocks and macroblocks typically are indexed by addresses (i, j) representing their position as well. Thus the block B(i,J) that contains the mesh node $p_n$ is determined by $i=[x_n]/8$ and $j=[y_n]/8$. In the case of macroblocks, the macroblock is identified by $i=[x_n]/16$ and $j=[y_n]/16$.

Prediction of motion vectors may occur in many ways. Three cases are identified below:

Case a: Forward motion vectors of the co-located block and perhaps its neighboring blocks in frame k are used for prediction to frame k−1.

Case b: Forward motion vectors of the co-located block and perhaps its neighboring blocks in frame k+1 are used as a basis for prediction to frame k.

Case c: Forward motion vectors of the co-located block in frame k (to frame k−1) are used to predict the node position in frame k+1 by $(x'_n, y'_n) = (x_n, y_n) - (a_{ij}, b_{ij})$. Once the new predicted node position is calculated, the block index is redefined using $(x'_n, y'_n)$. The forward motion vectors of the block co-located with $(x'_n, y'_n)$ and perhaps its neighbors as a basis for prediction.

A predicted motion vector $(\hat{u}_n, \hat{v}_n)$ is obtained from the co-located blocks identified as a basis for prediction. Again, several alternatives are available. In the simplest case, the motion vector of the one co-located block serves as the predicted motion vector for the mesh node $p_n$. However, more complex predictions are available. Neighboring blocks above, below, left and right of the co-located block also may serve as a basis of prediction. In FIG. 3, where B(1,1) is the block co-located with mesh node $P_2$, B(1,1) and the four neighboring blocks B(1,0), B(1,2), B(0,1) and B(2,1). The predicted motion vector $(\hat{u}_n, \hat{v}_n)$ simply may be an average or a weighted average of these blocks. Further, the eight blocks that neighbor the co-located block may serve as a basis for prediction. In the example of FIG. 3, B(1,1) and the eight surrounding blocks would be considered for prediction. Again, an average or weighted average may be used to compute the predicted motion vector $(\hat{u}_n, \hat{v}_n)$. Finally, the neighboring blocks may be identified flexibly depending on the location of $p_n$ within the co-located block B(ij). For example, if $p_n$ falls in a corner of the co-located clock; as p1 does in block B(0,2), the co-located block and neighbors nearest to the node may serve as the basis for prediction. For $p_n$, this would include blocks B(0,1), B(1,1), B(0,2) and B(1,2).

Rather than an average, the predicted vector may be calculated as the median of the blocks serving as a basis for prediction. Where the co-located block and the neighboring blocks are considered, the median predictor based on the four neighborhood of the block B(ij) is given by:

$$\hat{u}_n = -\text{median}\{a_{ij}, a_{i+1j}, a_{ij+1}, a_{ij-1}\} \text{ and } \hat{v}_n = -\text{median}\{b_{ij}, b_{i+1j}, b_{ij+1}, b_{ij-1}\}.$$

A residual vector is encoded for mesh node $p_n$ as $\Delta u_n = u_n - \hat{u}_n$ and $\Delta v_n = v_n - \hat{v}_n$, possibly according to a variable length encoding method. Returning to FIG. 2B, the decoder 600 performs video decoding to undo the coding applied at the encoder 500. In this sense, a demultiplexer 630, base layer decoder 610 and compositor 640 operate as described above with respect to FIG. 2A. The base layer decoder 610, however, also outputs block based motion vectors to the enhancement layer decoder 620. The enhancement layer decoder 620 receives encoded residual information from the demultiplexer 630. It also receives block based motion vectors from the base layer decoder 610.

Figure 4B:
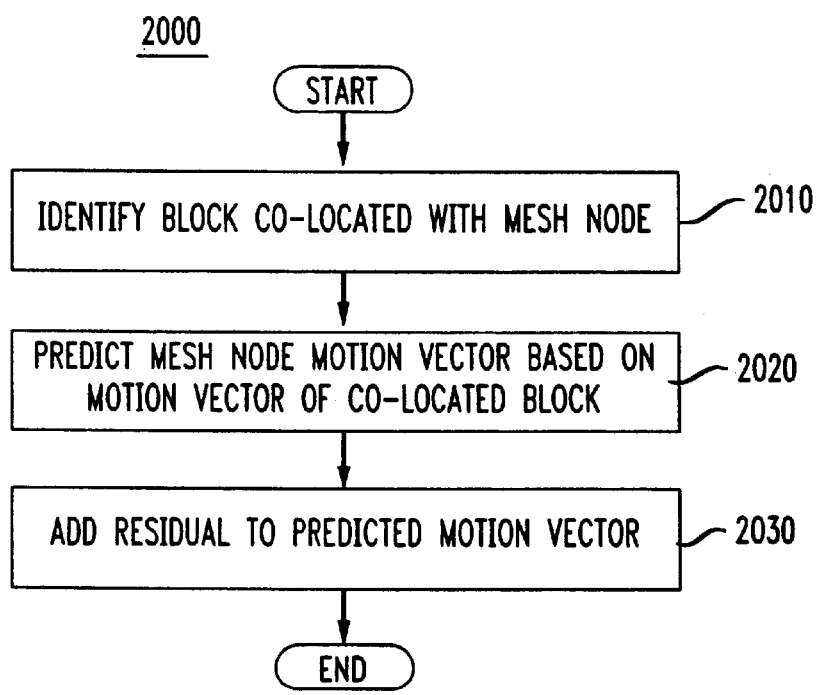
FIG. 4B is a flow diagram of an enhancement layer decoder operating in accordance with the present invention.

The enhancement layer decoder 620 operates in accordance with the decoding method 2000 of FIG. 4B. For a mesh node of interest $p_n$, the enhancement layer decoder 620 identifies a block B(ij) in which the mesh node sits (Step 2010). The enhancement layer decoder 620 predicts a motion vector for the mesh node based upon the co-located block and, perhaps, its neighbors (Step 2020). The enhancement layer decoder 620 then adds the predicted motion vector to the encoded residual motion vector for the node to obtain the actual motion vector of the mesh node (Step 2030). It outputs the actual motion vector to the compositor 640.

The two layer system of FIG. 2B also finds application with an optional back channel to provide decoder control of the mesh layer encoder. The back channel feature operates as described with respect to FIG. 2A.

The layered coding protocol of FIG. 2B achieves several objectives of the present invention. First, it achieves the advantages noted above with respect to the system of FIG. 2A. Additionally, however, by predicting the mesh node vectors from block based motion vectors, it provides for more efficient coding of the mesh node motion vectors. Residual vectors may be encoded at a lower bitrate that is necessary to code the mesh node motion vectors without prediction. Therefore, the system of FIG. 2B results in efficient coding of mesh node motion vectors and reduces capacity requirements of the channel.

Figure 5B:
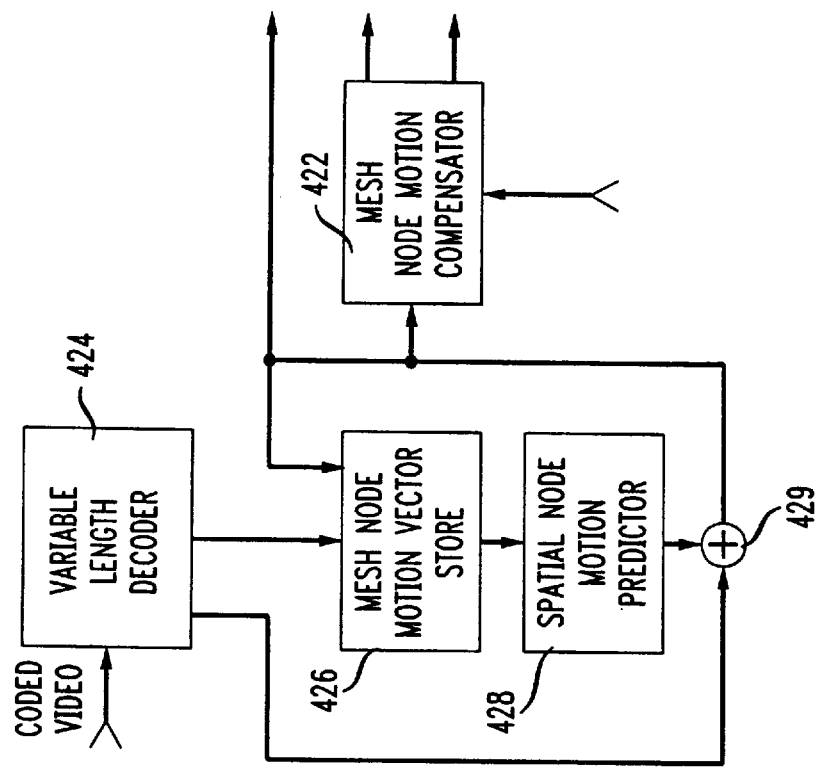
FIG. 5B illustrates an embodiment of an enhancement layer decoder 420 suitable for application with the system of FIG. 2A.
Figure 5A:
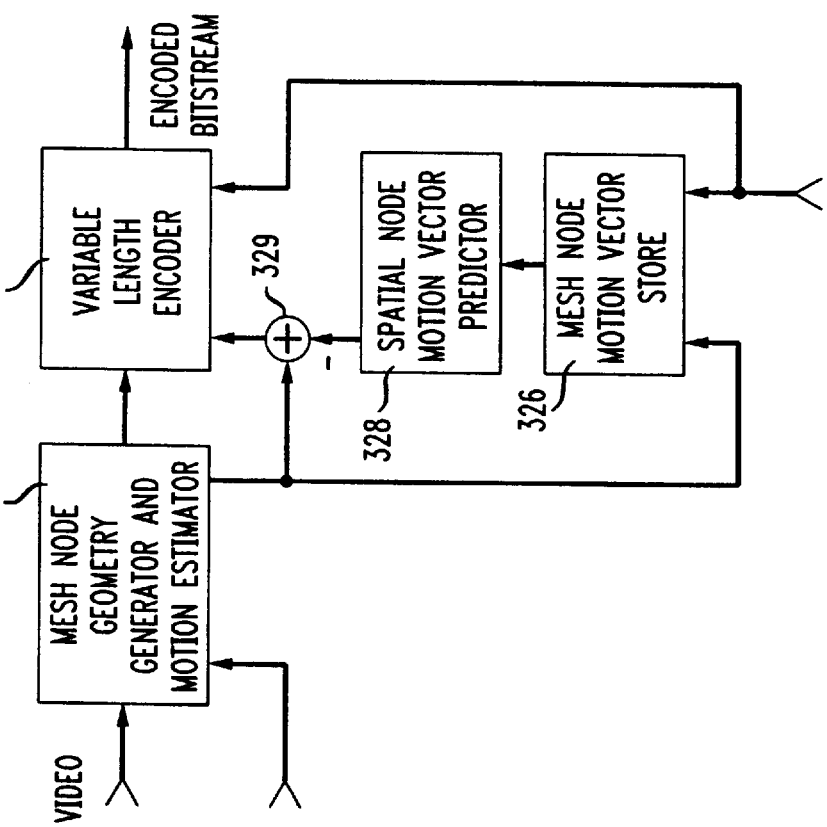
FIG. 5A illustrates an embodiment of an enhancement layer encoder 320 suitable for application with the system of FIG. 2A.

FIG. 5A illustrates an embodiment of an enhancement layer encoder 320 suitable for application with the system of FIG. 2A Video data and locally decoded VOP data is input to a mesh node geometry generator and motion estimator 322. The mesh node geometry generator and motion estimator 322 selectively generates mesh node geometry data or mesh node motion vector data on each frame. In a first mode, it generates mesh node geometry data representing starting points of each node in the wireframe mesh. Motion vectors represent movement of those mesh node in subsequent frames. The mesh node geometry data is differentially encoded, meaning that a position of a second node is represented by its difference from the position of an earlier coded node. The mesh node geometry data is encoded by a variable length encoder 324 and output from the enhancement layer encoder 320.

In a second mode, the mesh node geometry generator and motion estimator 322 generates motion vectors of the nodes in subsequent VOPs (frames). The mesh node motion vectors are input and stored in a mesh node motion vector store 326. To encode the motion vector of a particular node, a spatial node motion vector predictor 328 reviews motion vectors of previously encoded nodes and selects one that has a motion vector closest to the motion vector of the current node. The spatial node motion vector predictor outputs the selected motion vector to a subtractor 329. The subtractor 329 subtracts the selected motion vector from the actual motion vector and outputs the residual to the variable length encoder 324. The variable length encoder 324 encodes the residual mesh node motion vector data and outputs it from the enhancement layer encoder 320.

FIG. 5B illustrates an embodiment of an enhancement layer decoder 420 suitable for application with the system of FIG. 2A. The coded enhancement layer data is input to a variable length decoder 424. From the variable length decoder 424, mesh node geometry data is decoded by a mesh node motion compensator 422. For subsequent frames, the mesh node motion compensator 422 generates mesh node geometry data from the geometry data of the first frame and regenerated motion vector data generated within the enhancement layer decoder 420. The mesh node motion compensator 422 outputs mesh node geometry data and synthesized VOP data from the enhancement layer decoder 420.

Residual mesh node motion vector data is input to an adder 429. The adder combines the residual mesh node motion vector data with a predicted motion vector to regenerate the actual mesh node motion vector data. The predicted motion vector is generated by a mesh node motion vector store 426 and spatial node motion predictor 426 operating in the same manner as in the enhancement layer encoder 320. Regenerated motion vectors are stored in the mesh node motion vector store 424, input to the mesh node motion compensator 422 and may be output from the enhancement layer decoder 420 for other applications as desired.

Figure 6B:
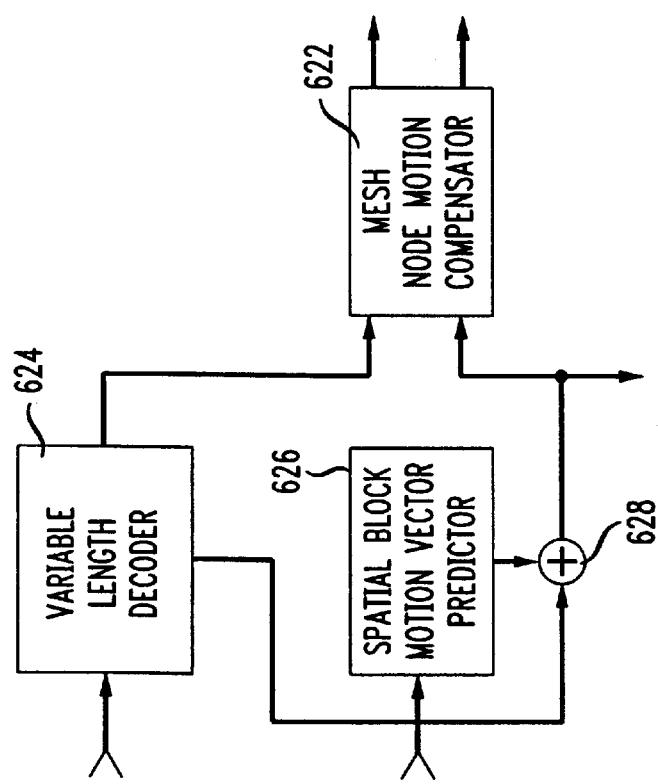
FIG. 6B illustrates an embodiment of an enhancement layer decoder 620 suitable for application in the system of FIG. 2B.
Figure 6A:
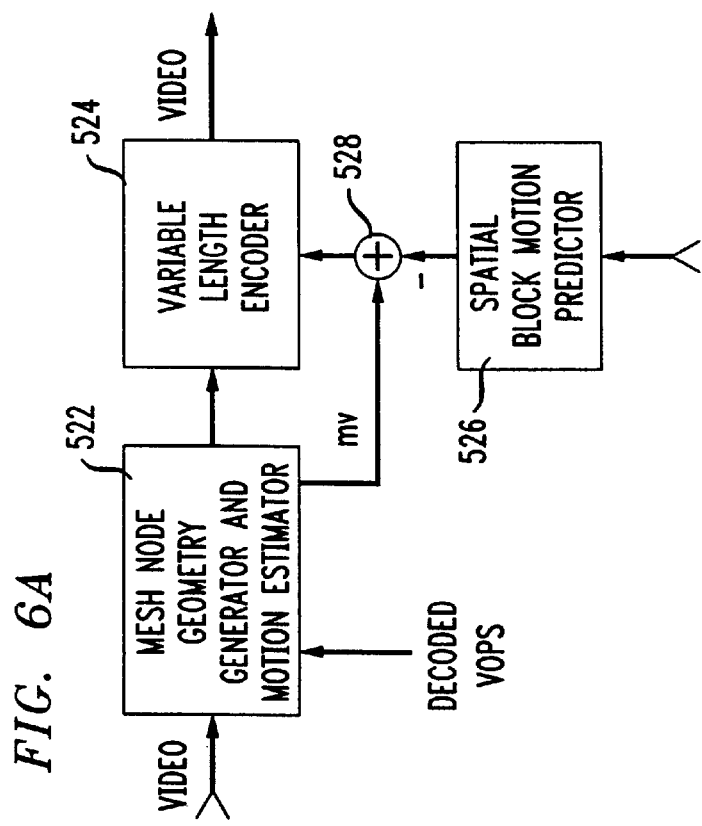
FIG. 6A illustrates an embodiment of an enhancement layer encoder 520 suitable for application in the system of FIG. 2B.

FIG. 6A illustrates an embodiment of an enhancement layer encoder 520 suitable for application in the system of FIG. 2B. There, input video data and locally decoded VOP data are input to a mesh node geometry generator and motion estimator 522 operating as described with respect to FIG. 5A. It outputs mesh node geometry data and mesh node motion vector data as described with reference to FIG. 5A. The mesh node geometry data is encoded by a variable length encoder 524 and output from the enhancement layer encoder 520.

Prediction of mesh node motion vectors is derived from the block based motion vectors obtained in the base layer. The block based motion vectors are input to a spatial block motion predictor 526. The predicted motion vector is output to a subtractor 528. The residual mesh node motion vector data, obtained by subtracting the predicted motion vector from the actual mesh node motion vector data, is encoded by the variable length encoder 524 and output from the enhancement layer encoder 520.

FIG. 6B illustrates an embodiment of an enhancement layer decoder 620 suitable for application in the system of FIG. 2B. The coded enhancement layer data is input to a variable length decoder 624. From there, mesh node geometry data is input to a mesh node motion compensator 622. The mesh node motion compensator 622, like that of FIG. 5B generates mesh node geometry data and synthesized VOPs for an initial frame from the mesh node geometry data. For subsequent VOPs, it generates mesh node geometry data and the synthesized VOP data from regenerated motion vector data.

At an adder 628, residual motion vector data from the variable length decoder 624 is combined with a predicted motion vector to obtain the regenerated motion vector data. The predicted motion vector is obtained from a spatial block motion vector predictor 626. Block based motion vectors are input to the spatial block motion vector predictor from the base layer decoder 610. The regenerated motion vectors are input to the mesh node motion compensator and may be output from the enhancement layer decoder 620 for other applications as desired.

We claim:

1. A channel carrying thereon coded video data including, in a first layer, block-based texture data and block-based motion data and, in a second layer, mesh node-based motion data, wherein decodable video data may be obtained solely from texture data and motion data of the first layer.

2. The channel of claim 1, wherein the mesh node based motion data is residual data to supplement a prediction based on the block-based motion data.

3. The channel of claim 1, wherein the channel is a memory.

4. The channel of claim 1, wherein the channel is a communication channel.

5. A video data signal generated according to the process of:

generating decoded video data based upon coded block-based texture data and coded block-based motion data, generating synthetic data based upon coded mesh-node-based motion data representative of the decoded video data and overlay image data, and outputting a composite video data signal based upon the decoded video data and the synthetic data signal.

6. The video data signal of claim 5, wherein the mesh-node based motion data is residual data reflecting a mesh-node motion prediction made with reference to the co-located block-based motion data.

7. A video decoder, comprising a base layer decoder that generates decoded video data from coded block-based texture data and coded block-based motion data received from a channel, and a compositor that generates synthetic video data based upon mesh node motion data received from the channel and externally supplied image data, the compositor superimposing the synthetic video data over co-located decoded video data.

8. The video decoder of claim 5, wherein the compositor predicts motion data based upon the block-based motion data and the mesh-node motion data.

* * * * *

UNITED STATES PATENT AND TRADEMARK OFFICE
CERTIFICATE OF CORRECTION

PATENT NO.    : 6,339,618 B1
DATED         : January 15, 2002
INVENTOR(S)   : Atul Puri, Riverdale, A. Murat Tekalp, and Petrus J. L. van Beek It is certified that error appears in the above-identified patent and that said Letters Patent is hereby corrected as shown below:

<u>Title page,</u>
Item [75], Inventors, the incorrect spelling of the surname of inventor, "Petrus J. L. van Beck" is hereby corrected to -- Petrus J. L. van Beek --.

Signed and Sealed this

Third Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,339,618 B1
DATED         : January 15, 2002
INVENTOR(S)   : Atul Puri, A. Murat Tekalp and Petrus J. L. van Beek It is certified that error appears in the above-identified patent and that said Letters Patent is hereby corrected as shown below:

<u>Title page,</u>
Item [73], should read
-- Assignees: AT&T Corp., New York, N.Y.; and
              Sharp Laboratories, Camas, Wash. --

Signed and Sealed this

Fifth Day of August, 2003

JAMES E. ROGAN
*Director of the United States Patent and Trademark Office*